Dec. 29, 1936.   H. F. SMITH   2,066,236
REFRIGERATING APPARATUS
Filed Feb. 28, 1931
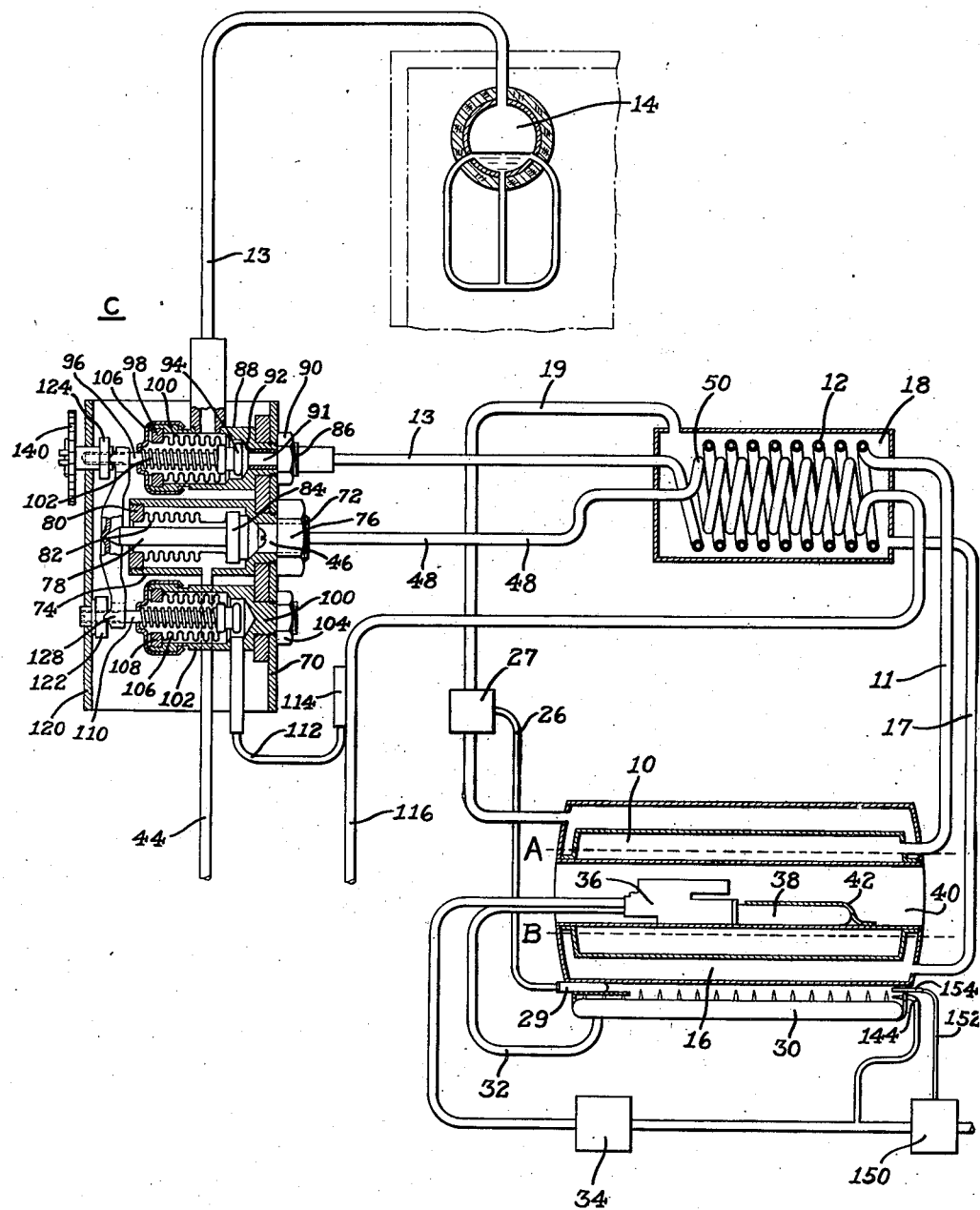
INVENTOR
*Harry F. Smith*
BY *Spencer, Hardman & Fehr.*
ATTORNEY Patented Dec. 29, 1936

2,066,236

UNITED STATES PATENT OFFICE 2,066,236

REFRIGERATING APPARATUS

Harry F. Smith, Dayton, Ohio, assignor, by mesne assignments, to General Motors Corporation, a corporation of Delaware Application February 28, 1931, Serial No. 519,117

7 Claims. (Cl. 62—5)

This invention relates to a method of and apparatus for producing refrigeration, and more particularly to refrigerating apparatus of the intermittent absorption type.

It is among the objects of my present invention to provide an improved method of and apparatus for producing refrigeration, and more particularly to provide an improved refrigerating system of the so-called intermittent absorption type.

It is also among the objects of my invention to provide improved automatic means for regulating the cooling of the condenser during the distillation period and for automatically controlling the cooling of the absorber during the absorption period. More particularly, it is an object of my invention to provide a unitary and compact structure automatically operated, and variable within certain limits for effecting the normal adjustment thereof, for maintaining a predetermined temperature within the evaporator; for regulating the cooling of the condenser; and for regulating the cooling of the absorber.

It is also among the objects of my invention to provide in refrigerating apparatus utilizing a closed secondary system for heating and cooling the generator-absorber, improved means for positively starting and stopping the heating and cooling of the generator-absorber; to provide means for stopping the circulation within the heating and cooling circuit during the heating period independent of the temperature or pressure therein.

Further objects and advantages of the present invention will be apparent from the following description, reference being had to the accompanying drawing, wherein a preferred form of the present invention is clearly shown.

In the drawing:

The figure is a diagrammatic illustration of a system embodying my invention.

Referring to the drawing, I have disclosed a refrigerating apparatus of the intermittent absorption type comprising the conventional generator-absorber 10, connected through the conduit 11 to the condenser coil 12, the condenser in turn discharging through a conduit 13 into the evaporator 14. The evaporator 14 is, of course, the cooling or refrigerating element and in practice will be located within the compartment to be cooled, generally designated on the drawings by the dot and dash lines.

Means are provided for heating and cooling the generator-absorber 10 comprising in this modification a closed circuit for a fluid, or, more specifically, a liquid, and preferably a volatile liquid such as monofluorodichloro-methane. The circuit comprises a portion in heat exchange relation with the generator-absorber shown in the form of a jacket 16 substantially surrounding the generator-absorber 10. The jacket 16 is connected at its lower end by means of a conduit 17 to the lower part of a compartment 18, hereinafter more fully described. At its upper end, the jacket 16 is connected to the upper portion of the compartment 18 by means of a conduit 19. The burner 30 is located below the jacket 16 being supplied with gas or other fuel through the pipe line 32 provided with a pressure reducing valve 34. Located within the conduit 19 is a valve 27 (herein shown diagrammatically since it may take the form of any conventional snap acting thermostatic valve) automatically opened and closed by fluid pressure within the thermostatic circuit 26, the bulb 29 of which is carried by and is subject to the heat of the burner 30, as will be more fully described hereinafter.

I have provided means for controlling the flow of gas or other fuel to the burner 30, this means being indicated generally as a snap acting valve 36 of any known type actuated by pressure of a volatile fluid within the thermostatic bulb 38. The generator-absorber 10 is provided with a flue 40 extending therethrough and a pocket 42 is welded or otherwise secured within the flue 40 to receive the thermostatic bulb 38. It should be noted that the valve 36 and the bulb 38 are formed as a unitary structure and may be readily removed from or inserted into the pocket 42 within the flue 40.

Cooling water for the system enters through the conduit 44 and passing through the valve 46 and conduit 48 is conducted through the coil 50 located within the compartment 18.

The portion of my apparatus as so far described may be briefly outlined at this time as follows. Assume that the generator-absorber 10 is properly charged with absorbent material and ammonia, for example, as disclosed in my prior Patent No. 1,791,515; that the closed fluid circuit is charged substantially to the line indicated at A; that cooling water is flowing through the conduit 50; that the temperature of the generator-absorber is such as to actuate the gas valve 36 to the open position; and there is some conventional type of pilot light to ignite the burner 30. Fuel will then flow to the burner 30 and will be ignited by the pilot light and will heat the volatile liquid within the jacket 16. The heat from the burner 30 will expand the volatile liquid within the bulb 29, thereby increasing the pressure within the thermostatic circuit 26 to such an extent as to close the valve 27. Heating of the volatile liquid within the jacket 16 will cause some of the volatile liquid to evaporate, the vapors being trapped above the liquid level indicated at A in the jacket 16. The increase in pressure within the jacket 16 will force a substantial portion of the volatile liquid from the jacket 16 up through the conduit 17 into the compartment 18 until the level of volatile liquid within the jacket 16 falls to that indicated by the line B. Continued heating of the jacket 16 will cause further evaporation of the volatile liquid therein, the vapors condensing upon the sides of the generator-absorber 10 to heat the absorbent material contained therein. The heat of the generator-absorber 10 will liberate ammonia from the absorbent material therein, and the ammonia gas passing upwardly through the conduit 11 will condense within the conduit 12 and will finally be discharged into the evaporator 14. The temperature within the generator-absorber will remain substantially constant until such time as the predetermined amount of refrigerant ammonia has been driven from the absorbent material. At this time the temperature will rapidly increase, expanding the volatile liquid within the bulb 38 to snap the gas valve 36 to the closed position. The thermostatic bulb 29 will now rapidly cool, causing the valve 27 to snap to the open position. The volatile liquid contained within the compartment 18 will, upon the opening of the valve 27, flow downwardly through the conduit 17 into the jacket 16 and coming in contact with the hot generator-absorber 10 will evaporate on the surfaces thereof to cool the contents of the generator-absorber. The vapors will pass upwardly through the conduit 19 to the compartment 18 wherein they will be again condensed by the cooling action of the water flowing through the conduit 50. Cooling of the absorbent material within the generator-absorber 10 will, of course, lower the pressure within the entire refrigerating apparatus including the evaporator 14 and consequently the liquid refrigerant within the evaporator 14 will evaporate, the vapors passing back through the conduit 13, conduit 12, and conduit 11 to be reabsorbed within the generator-absorber.

In order to control the operation of the machine, and more particularly to maintain a substantially constant temperature within the evaporator 14, I have disclosed means for controlling the flow of cooling water through the conduit 50 during both the condensing and absorbing periods, the controlling apparatus being generally designated by the reference character C. This structure comprises a valve 46 in the water inlet line, or, in other words, on the cold side of the condenser coil 50, actuated by a lever whose pivot point shifts during different periods of the operation of the apparatus. For example, a plate 70 is provided with an opening into which extends the reduced end or shank 72 of a cage 74, the cage being held securely and removably in place by the nut 76 threaded on the shank 72. Within the cage 74 is provided the water valve 46 having actuating rod 78 extending through an opening formed in the rear wall 80 of the cage 74, the opening being sealed against the escape of water by a bellows 82 having one end secured to the rear wall and the other end secured to the valve head 84. Water enters the interior of the cage 74 through the conduit 44 and passes outwardly therefrom through the valve 46.

At one side of the water valve the plate 70 is provided with a second opening receiving the reduced end or shank 86 of a second cage 88, this second cage 88 being secured removably in position by means of the nut 90 threaded onto the shank 86. The shank 86 is hollow providing a passage 91 communicating with the refrigerant conduit 13. Within the cage 88 there is likewise provided an operating rod 96 extending rearwardly through an opening formed in the rear wall 98 of the cage 88, and this opening is similarly sealed against the escape of refrigerant by means of a bellows 100 having one of its ends secured to the rear wall 98 and its other or movable end secured to the head 94 of the operating rod 96. A spring 102 surrounds the rod 96 and, having one end bearing against the head 94 and the other end bearing against a clip or cover plate 106 secured to the cage 88, normally urges the bellows 100 to its expanded position. The interior of the cage 88 communicates with the conduit 13 leading to the evaporator 14 so that refrigerant may flow from the condenser coil 12 to the evaporator 14 or from the evaporator 14 back into the condenser.

On the other side of the valve 46 the plate 70 is provided with a third opening into which fits the reduced end or shank 100 of the third cage 102, this third cage being likewise secured removably in position by means of the nut 104 threaded onto the shank 100. Within the cage 102 is provided a bellows 106 having its stationary ends fixed to the rear wall 108 of the cage 102. An operating rod 110 is secured to the movable end of the bellows 106 and extends rearwardly through an opening in the rear wall 108. The interior of the cage 102 communicates with a thermostatic circuit 112, the bulb 114 of which is secured to the water discharging conduit 116. The circuit 112 and the bulb 114 contain a volatile liquid adapted to expand and contract the bellows 106.

A second plate 120, spaced rearwardly from the plate 70, is provided with two openings aligned with the operating rods 96 and 110 respectively. Rod 110 extends into and slides in one of these openings, an adjustable nut 122 regulating the degree of sliding movement of the rod 110. Rod 96 likewise extends in the second opening in the plate 120 and a nut 124 regulates the degree of movement of the rod 96. A lever 126 is bifurcated at both of its ends as shown at 128, straddles rod 96 at one end and rod 110 at its other end, engaging the nuts 124 and 122 respectively. At its center, the lever 128 engages the rod 78 of the water valve 46.

In operation of my improved controlling device, assume that the heat is being applied to the generator-absorber 10 and that refrigerant from the condenser coil 12 is passing to the evaporator 14. The pressure within the evaporator is at this time relatively high and the bellows 100 will be compressed to force the rod 96 rearwardly as far as it will move, that is, until the nut 124 engages and presses against the stop plate 120. Water valve 46 will now be in the control of the bellows 106 which is responsive to the temperature of the cooling water leaving the condenser through the conduit 116. As the temperature of the cooling water increases, indicating insufficient cooling of the condenser, the volatile liquid within the bulb 114 will expand, thereby compressing the bellows 106 to move the lever 128 around the pivot point (nut 124) to thereby further open the water valve 46 to increase the flow of cooling water. A reduction in the temperature of the cooling water will indicate the use of too much cooling water and the action of the bellows 106 will be reversed to further close the valve 46 to reduce the flow of cooling water through the coil 50 located within the compartment 18.

As the distillation period or the heating period for the generator-absorber 10 approaches the point at which the thermostat 38 is set to discontinue the flow of fuel to the burner 30, the temperature of the cooling water flowing through the coil 50 will gradually decrease, gradually closing the valve 46. After the thermostat 38 has closed the gas valve 36 to discontinue heating of the generator-absorber 10, the vapor valve 27 will open as previously described. The circulation of the fluid through the closed secondary system, including the jacket 16, conduits 17 and 19, and compartment 18, will raise the temperature of the water flowing through the coil 50 thereby again opening the valve 46. The temperature of the cooling water flowing through the conduit 116 will increase to such an extent as to force the rod 110 as far rearwardly as possible, that is to say, until the nut 122 engages the stop plate 120.

As the cooling of the generator-absorber 10 continues, the pressure within the entire refrigerating apparatus, including the evaporator 14, will decrease causing an evaporation of the liquid refrigerant within the evaporator 14. The vapors will pass from the evaporator 14 back through the conduit 13 to be reabsorbed in the absorbent material within the generator-absorber 10. As the pressure within the evaporator 14 decreases, indicating a lowering of the temperature within the compartment to be cooled, the bellows 100 within the cage 88 will gradually expand moving the lever 128 about its pivot point (nut 122) to gradually close the valve 46, thereby reducing the flow of cooling water through the coil 50. The rate of absorption within the generator-absorber 10 is thereby controlled in response to the pressure within the evaporator 14 to maintain a substantially constant predetermined temperature within the evaporator 14. Should the temperature, and consequently the pressure, within the evaporator 14 increase, the bellows 100 will be compressed to further open the water valve 46 and thereby increase the flow of cooling water through the coil 50 to increase the rate of absorption within the generator-absorber 10. The increase in the rate of absorption will immediately reduce the pressure, and consequently the temperature, within the evaporator 14.

It should be noted that the spring 102 surrounding the operating rod 96 is set to maintain the desired pressure and temperature within the evaporator 14. In order to provide a slight variation in the working range of pressures and temperatures within the evaporator 14, I have provided an adjustable mechanism or cold control, shown in the form of a rotary member 140 threaded upon the rod 96. By rotating the rotary member 140 in a counter clockwise direction, the nut 124 is moved outwardly on the rod 96. This, in effect, lengthens the rod 96 and requires a lower pressure within the cage 88 to stop the flow of cooling water through the valve 46. This adjustment may be made without affecting the normal adjustment of the spring 102, for upon turning the rotary member 140 in a reverse direction, the original setting of spring 102 is restored, thereby returning the system to its normal operating conditions.

In order to render the apparatus entirely automatic in operation, any conventional type of pilot light and automatic control of the flow of fuel due to the accidental extinguishing of the pilot light may be provided. For example, a pilot light 144 may be connected directly into the gas supply line and an automatic valve 150 automatically controlled by the thermostat 152 may also be provided. In this arrangement the thermostatic bulb 154 is subject to the heat of the pilot light to such an extent that as long as the pilot light is on the pressure within the bulb 154 is sufficient to maintain the valve 150 open. If the pilot light should be accidentally extinguished, the pressure within the thermostatic bulb will decrease to permit the valve 150 to close, thereby preventing the operation of the apparatus. The valve 150 is, of course, provided with a manual adjustment for reopening the valve 150 to again start the apparatus after discovery of the accidental extinguishing of the pilot light.

In the foregoing specification and in the drawing, I have described and illustrated an improved absorption system of the intermittent type wherein the heating and cooling of the generator-absorber is accomplished by means of a secondary system. Such a system has been illustrated because the automatic control of the heating means and the control of the circulation of the volatile fluid within the secondary circuit is specific to such a system.

However, it should be understood that the control means indicated at C is merely an embodiment of specific instrumentalities for illustrative purposes only. Such a control is not limited to the specific type of absorption system disclosed, but may be utilized equally as well on apparatus wherein the condenser is cooled by one flow of cooling water and the generator-absorber is cooled by a parallel flow of cooling water. In such a system the water flowing through the valve 46 would be directed through the generator-absorber during the cooling of the generator-absorber and the flow would be, as in the illustrated case, controlled by the expansion and contraction of the bellows 100. During the generating period the water flowing through the valve 46 would be directed through the condenser and the flow therethrough would be controlled by the bellows 106.

From the foregoing, it will be evident that I have provided an improved absorption refrigerating machine of the intermittent absorption type wherein there are incorporated means for automatically regulating the cooling of the condenser during the generating period; for automatically regulating the flow of cooling water during the absorption period; for automatically conserving cooling water during both the generating and absorbing periods; and for automatically maintaining the temperature within the evaporator substantially constant with provisions for varying this temperature by a slight movement of a lever or rotary device by the user thereof; and particularly means incorporating all of these means in a compact and unitary device.

It will also be noted that in the specific heating and cooling means disclosed and in the control thereof, that circulation is prevented independent of the pressure thereof and that the operation of the heating means is directly controlled by the conditions within, and specifically the temperature within, the generator-absorber 10.

It should also be noted that in the controlling device C, the various bellows and cages may be removed laterally by removing the corresponding nuts.

While the form of embodiment of the invention as herein disclosed, constitutes a preferred form, it is to be understood that other forms might be adopted, all coming within the scope of the claims which follow.

What is claimed is as follows:

1. In a refrigerating system, a generator-absorber provided with a flue extending therethrough, means for heating said generator-absorber, a pocket formed in said flue and a thermostatic valve for controlling the flow of gas to said heating means, said thermostatic valve being carried in said pocket.

2. Refrigerating apparatus comprising a generator-absorber, a condenser, and an evaporator, means for alternately and intermittently heating and cooling said generator-absorber, means for cooling said condenser, and automatic means for controlling the cooling of the condenser during the heating of the generator-absorber and for controlling the cooling of the generator-absorber during the cooling period.

3. Refrigerating apparatus comprising a generator-absorber, a condenser, and an evaporator, means for alternately and intermittently heating and cooling said generator-absorber, a conduit for the cooling fluid, means responsive to the temperature of the cooling fluid for controlling the flow of cooling fluid through said conduit during the heating period, and means responsive to the pressure within the evaporator for controlling the flow of fluid through said conduit during the cooling of said generator-absorber.

4. Refrigerating apparatus comprising a generator-absorber, a condenser, and an evaporator, means for alternately and intermittently heating and cooling said generator-absorber, a conduit for cooling water, a valve in said conduit, means responsive to the temperature of the cooling water for controlling said valve during the heating period, and means responsive to the pressure within the evaporator for controlling said valve during the cooling of said generator-absorber.

5. Refrigerating apparatus comprising a generator-absorber, a condenser, and an evaporator, means for alternately and intermittently heating and cooling said generator-absorber, means for cooling said condenser, means responsive to the temperature of said cooling means for controlling the cooling of said condenser during the heating of the generator-absorber, and means responsive to the condition within the evaporator for controlling the cooling of the generator-absorber during the cooling period.

6. Refrigerating apparatus comprising a generator-absorber, a condenser, and an evaporator, means for alternately and intermittently heating and cooling said generator-absorber, means for cooling said condenser, means responsive to the temperature of said condenser cooling means for controlling the cooling of the condenser during the heating period, and means responsive to the temperature of the evaporator for controlling the cooling of the generator absorber during the cooling period.

7. A unitary controlling device for an intermittent absorption machine comprising a valve structure, temperature responsive means for controlling the valve during one operation of the apparatus and pressure responsive means for controlling the operation of the valve during the second period of operation of the apparatus.

HARRY F. SMITH.